United States Patent
Ronner

(10) Patent No.: US 8,888,938 B2
(45) Date of Patent: Nov. 18, 2014

(54) ASSEMBLY KIT FOR SUPPLYING A FIXING AGENT AND METHOD FOR FIXING AN OBJECT ON A BASE

(75) Inventor: Christian Ronner, Glarus (CH)

(73) Assignee: Glabete AG, Glarus (CH)

( * ) Notice: Subject to any disclaimer, the term of this patent is extended or adjusted under 35 U.S.C. 154(b) by 15 days.

(21) Appl. No.: 13/501,142

(22) PCT Filed: Oct. 8, 2010

(86) PCT No.: PCT/EP2010/006153
§ 371 (c)(1),
(2), (4) Date: Apr. 10, 2012

(87) PCT Pub. No.: WO2011/042196
PCT Pub. Date: Apr. 14, 2011

(65) Prior Publication Data
US 2012/0205027 A1    Aug. 16, 2012

(30) Foreign Application Priority Data
Oct. 10, 2009   (DE) .................. 10 2009 049 027

(51) Int. Cl.
C09J 5/00 (2006.01)
B29C 65/52 (2006.01)
B32B 37/12 (2006.01)
B32B 43/00 (2006.01)
C08J 5/10 (2006.01)
C09J 9/00 (2006.01)
F16B 11/00 (2006.01)

(52) U.S. Cl.
CPC .. *C09J 9/00* (2013.01); *F16B 11/006* (2013.01
USPC ...... 156/71; 156/307.3; 156/307.7; 156/329 )

(58) Field of Classification Search
USPC .......... 156/71, 307.1, 307.3, 307.7, 325, 329
See application file for complete search history.

(56) References Cited

U.S. PATENT DOCUMENTS

| | | | | |
|---|---|---|---|---|
| 5,370,221 A | * | 12/1994 | Magnusson et al. .......... | 206/221 |
| 5,714,216 A | * | 2/1998 | Banhardt et al. ............. | 428/34.4 |
| 6,641,307 B2 | * | 11/2003 | Matsuda et al. ................ | 383/38 |
| 7,147,742 B2 | * | 12/2006 | Kirsten ...................... | 156/272.2 |
| 2010/0024975 A1 | * | 2/2010 | Hecht ........................ | 156/307.1 |
| 2011/0100528 A1 | * | 5/2011 | Ronner ......................... | 156/91 |

FOREIGN PATENT DOCUMENTS

| | | | |
|---|---|---|---|
| DE | 102009023285 | 1/2010 | |
| EP | 0366026 A1 | 5/1990 | |
| EP | 1536148 A1 | 6/2005 | |
| JP | 54061241 A * | 5/1979 | ................ C09J 5/00 |

OTHER PUBLICATIONS

English Abstract of JP 54-061241A.*
International Search Report of PCT/EP2010/006153 Dated Jul. 20, 2011 With an English Translation.

* cited by examiner

*Primary Examiner* — Sing P Chan
(74) *Attorney, Agent, or Firm* — Venable LLP; Robert Kinberg

(57) ABSTRACT

An assembly kit is provided for supplying a fixing agent to fix two objects. The kit comprises two storage receptacles. An aerobic adhesive is stored in one of the two storage receptacles. A hydrophilic material containing moisture is separately stored in the other of the two storage receptacles. The two storage receptacles are adapted to permit removal of the aerobic adhesive and the hydrophilic material from the receptacles for mixing together the fixing agent.

12 Claims, 2 Drawing Sheets

ASSEMBLY KIT FOR SUPPLYING A FIXING AGENT AND METHOD FOR FIXING AN OBJECT ON A BASE

CROSS-REFERENCE TO RELATED APPLICATIONS

This application is a national stage of International Application No. PCT/EP2010/006153, filed Oct. 8, 2010, claiming priority to German Application No. DE 10 2009 049 027.2, filed Oct. 10, 2009.

BACKGROUND OF THE INVENTION

The invention relates to a fixing agent and a method for fixing an object on a base.

Attaching objects to the walls of buildings and the like represents a specific area of application where the method and/or the fixing agent in question can be used. In particular the walls of sanitary and kitchen areas are provided with wall coverings consisting of ceramic tiles or other tiles, or of stone and marble plates. The method generally relates to very different areas of application, such as the areas of airplane construction, ship construction and steel construction.

To attach equipment items such as furniture, lamps, sanitary equipment pieces in the form of towel holders or the like to these types of walls, fixing agents such as screws can in particular be used in a manner known per se. However, these fixing agents require that holes to be drilled into the walls, into which dowels must also be inserted. To prevent damage to very expensive wall coverings such as the ceramic tiles and other tiles, these holes are normally inserted into the joints between the tiles, thereby restricting in an undesirable manner the location for the fixing agents. A further disadvantage is that if the location where an equipment item is attached must be changed after a period of time, the holes inserted at the previous locations are visibly exposed, thereby considerably detracting from the total optical impression of the wall, even if the holes are subsequently filled with a filler material. To avoid these disadvantages, attempts have been made to replace fixing agents in the form of screws with adhesive agents.

In the simplest case, adhesive strips can be used which, for this very simple case, can also mean a double-sided adhesive tape. On the one hand, fixing agents of this type have the disadvantage that they can detach themselves again over time, wherein it is a further disadvantage that heavy equipment items cannot be attached to the walls with said strips or tape.

Also conceivable in principle is the use of aerobic adhesive as a fixing agent for securing objects on bases, such as the walls of a room in a building. One problem, however, is that aerobic adhesives of this type require several hours to harden, wherein it is necessary to supply liquid to the aerobic adhesive. However, if a layer of aerobic adhesive is applied to an object and the object is then pressed with the layer of aerobic adhesive against the base, the layer between the base and the object is cut off from the ambient air, so that a hardening of the aerobic adhesive is no longer possible.

A mounting system which permits the use of an aerobic adhesive of this type is known from the International Patent Application Publication No. WO 03/036106.

This mounting system is used for locally attaching objects such as towel holders, shelves, lamps or similar equipment items to a wall, a ceiling or the like, in particular to a surface covered with ceramic and other tiles or marble plates or to the wall surfaces of rooms provided with similar wall coverings. The mounting system consists of different types of fastening elements and an adhesive and joining agent which can be an aerobic adhesive. The fastening elements are made of sintered metals for which the shape must be adapted, depending on the use. The disadvantage of these systems is that they require very long hardening times for the adhesive, which can take up to twelve hours, wherein this strongly impairs the user friendliness of the mounting system.

The fastening element is used to accommodate an element for holding the object and consists of a basic body provided with a receptacle on the back side which is facing the wall, as well as a filling opening which empties into the latter and is used for inserting the adhesive and/or joining agent into the space between the fastening element and the wall.

The fastening element is provided with at least one liquid-permeable and gas-permeable opening to allow air to escape which is displaced by the adhesive and/or fixing agent inserted into the receptacle, wherein this opening extends from the receptacle to a different surface of the fastening element and accommodates the excess adhesive and/or joining agent.

The back side of the basic body which faces the wall is liquid-permeable and gas-permeable, at least in partial regions thereof, such that the gas developing during the hardening of the adhesive and joining agent in the receptacle can escape and/or that the volatile binding agent can evaporate and, at the same time, ambient air can reach this adhesive and joining agent, thus allowing it to harden and ensuring a stable, stress-resistant attachment of the fixing agent on the wall.

The disadvantage in this case, however, is that the shaping of the basic body requires considerable additional structural expenditure and, in particular, also restricts an optional embodiment of the fixing agent.

A fixing agent is known from German patent document DE 10 2009 023 285 which is composed of a mixture of aerobic adhesive and hydrophilic material.

By adding the hydrophilic material to the aerobic adhesive, a mixture is obtained which forms the fixing agent and which no longer requires surface contact with moist ambient air so that it can harden from the surface out. Rather, the hydrophilic material in the mixture, which is interspersed in the aerobic adhesive, ensures that the aerobic adhesive contained in the mixture can harden from the inside out even if there is no longer any contact with ambient air containing the moisture, meaning if the mixture is surrounded on all sides by diffusion-tight surfaces. The moisture needed for the hardening and/or the required oxygen is present in the hydrophilic material itself because its hydrophilic characteristics ensure that it contains sufficient moisture to meet the conditions necessary for the hardening of the aerobic adhesive in the mixture forming the fixing agent.

Since the hydrophilic materials release their moisture to the environment, depending on the environmental conditions, or also absorb moisture from the environment, the moisture content of the hydrophilic material may not be sufficient, depending on the application case, to ensure a complete hardening of the mixture once it is mixed with the aerobic adhesive.

The amount of moisture in the hydrophilic material and/or in the mixture of hydrophilic material and aerobic adhesive, however, is extremely important. Too much moisture destroys the adhesive bond while too little moisture does not result in a reaction in the aerobic adhesive which in particular is composed of polymers, so that no hardening occurs.

To obtain a suitable degree of moisture in the fixing agent DE 10 2009 023 285 discloses that moisture is metered into the mixture of aerobic adhesive and hydrophilic material. In particular, this involves a metered adding of moisture to the hydrophilic material before it is mixed with the aerobic adhesive.

A wooden spatula which is used to mix together the components is particularly suitable for metering in a liquid, wherein this spatula is first submerged in water or generally in an amount of liquid. The amount of water or in general the amount of liquid which can be absorbed by the spatula forms a metered amount of liquid which is supplied to the mixture of aerobic adhesive and hydrophilic material. The hydrophilic material in this case can function as moisture buffer which absorbs excess moisture and releases it again as needed. Owing to the mixing operation, the moisture is mixed into the complete volume, thereby allowing the mixture to harden completely. Alternatively to a spatula, other metering devices can also be used for supplying the liquid, wherein the use of encapsulated elements which contain liquid is in principle also possible. These elements burst open during the mixing operation and thus release the liquid into the mixture. In the same way as mixing in the hydrophilic material, the adding of the capsules makes it possible to improve the tensile strength and the shearing strength of the fixing agent, wherein it is possible in principle to add storage granules to the hydrophilic material for supplying the moisture.

As a result of the mixing with the hydrophilic material, the hardening takes place considerably faster than with all other methods.

The fixing agent thus allows attaching objects simply by inserting a layer of the fixing agent between the two objects.

The layer of fixing agent can thus be inserted into optional receptacles or holes in the objects and, once these objects are joined, can be located inside a completely enclosed space that is isolated from the ambient air, meaning a space delimited by diffusion-tight surfaces, wherein a secure hardening of the aerobic adhesive is nevertheless ensured and thus also a connection between the objects which can be subjected to high stress forces. The fixing agent can furthermore also be applied to flat surfaces. The fixing agent can therefore be used between two diffusion-tight surfaces in order to join these surfaces.

The composition of the aerobic adhesive in the form of silane-modified (MS) polymers is described in DE 10 2009 023 285.

As explained further in DE 10 2009 023 285, the hydrophilic materials can be salts. Alternative hydrophilic materials are hydrophilic carrier fibers, which can be natural fibers or synthetic fibers and which preferably are cotton fibers. In principle, substances such as chalk, flour, expanded clay, galactose, cotton wool, flax, hemp, viscose, cellulose, sea grass, felt or also wood fibers, air-entraining filters or breathable materials in general are suitable for use as hydrophilic materials.

One essential advantage of the fixing agent, described in DE 10 2009 023 295, is that a precise mixing ratio of aerobic adhesive and hydrophilic material need not be maintained to ensure the function according to the invention of the fixing agent. To ensure the best possible hardening of the aerobic adhesive, it is simply advantageous if the hydrophilic material is mixed as homogeneously as possible with the aerobic adhesive.

For the use of the fixing agent, it is furthermore essential that the components of the fixing agent are mixed together just prior to the use of the fixing agent.

An assembly kit is usefully provided for this which comprises two receptacles for the separate storage of the aerobic adhesive and the hydrophilic material, especially the hydrophilic carrier fiber. The desired amounts of the components can then be removed from these storage areas for mixing together the fixing agent.

The components of the fixing agent can be mixed together quickly and easily even by untrained personnel since no precise mixing ratios must be observed for the aerobic adhesive and the hydrophilic material.

A further advantage of the fixing agent is that it allows creating a reversible connection between two objects. This is based on the fact that the connection between the objects is extremely resistant to tensile forces acting upon the connection, but is less resistant to shearing forces acting upon it. The connection created with the fixing agent can thus be detached again by rotating an object. Residual amounts of fixing agent can subsequently be removed from the connecting locations with the aid of a spatula or the like.

According to the method disclosed in DE 10 2009 023 285, an object is affixed to a base with the aid of the following method steps:

For preparing the fixing agent, the hydrophilic material and in particular the hydrophilic carrier fibers must first be mixed together with the aerobic adhesive. Following this, a layer of fixing agent is applied to the object and the object is then affixed to the base by pressing the layer of fixing agent against the base. The aerobic adhesive in this layer then hardens as a result of the moisture contained in the hydrophilic material.

The liquid may be metered into the hydrophilic material prior to mixing together the aerobic adhesive and the hydrophilic material.

The aerobic adhesive and the hydrophilic material in particular are mixed together. Prior to that, the hydrophilic material is dried to prevent the hydrophilic material in the mixture from reacting with the aerobic adhesive. Moisture is then supplied to the mixture when preparing the fixing agent.

The hydrophilic material may be dried at least to approximately 0% humidity in the air before being mixed with the aerobic adhesive.

One advantage of this variant is that the mixture of aerobic adhesive and dried hydrophilic material can also be stored over a longer period of time since the hydrophilic material does not contain any moisture which would lead to a reaction with the aerobic adhesive and would thus result in the fixing agent.

The mixture in the form of a ready-to-use mixture can be filled into suitable containers and supplied to the clients who must only add liquid or moisture, in particular in the form of water, to produce the fixing agent.

The mixture is advantageously produced by adding dry hydrophilic material to the aerobic adhesive, maximally until the adhesive no longer absorbs hydrophilic material.

Observing this mixing ratio can be controlled simply by visually determining how long the aerobic adhesive can still absorb hydrophilic material which is added to the mixture.

According to one embodiment, a cartridge with 2 chambers is used for preparing the fixing agent, wherein one chamber is filled with the mixture of aerobic adhesive and dried hydrophilic material and the other chamber is filled with liquid, in particular water. The mixture and the liquid exiting the chambers are then mixed together with the aid of a mixing nozzle.

The 2-chamber cartridge is extremely easy to handle and has a compact structural configuration.

It is furthermore advantageous that following the mixing of the fixing agent, the residual amount of the mixture of aerobic adhesive and dried hydrophilic material which may still be inside the chamber can be used later on and can also be stored inside the cartridge chamber for longer periods of time.

According to one alternative embodiment, the mixture composed of aerobic adhesive and dried hydrophilic material is brought in contact with an object containing moisture.

This variant makes use of the circumstance that even small amounts of liquid, for example moisture contained in a wooden component, will be sufficient to allow the mixture of aerobic adhesive and hydrophilic material to react and form the fixing agent and/or to allow the fixing agent to harden.

It is particularly advantageous if the base is a wall and the object is a fastening element on which an equipment item can be affixed.

For this, the equipment item is attached to the fastening element once the layer of fixing agent between the wall and the fastening element has hardened. In general, however, equipment items can also be attached directly to the wall with the aid of the fixing agent.

The fastening element is generally attached to the wall without the use of screws and the like, so that no holes must be drilled into the wall.

As a result, an attachment can be accomplished without damage to or impairment of the wall.

This is particularly advantageous if the wall is provided with tiles or a similar wall covering, or is covered with stone or marble plates to which the fastening element is attached.

The sensitive and typically high-quality wall covering consequently is not in danger of being damaged or impaired during the attachment process.

SUMMARY OF THE INVENTION

It is an object of the present invention to further improve the functionality of the fixing agent and the method described in German patent document DE 10 2009 023 285.

According to one embodiment of the invention there is provided an assembly kit for supplying a fixing agent for fixation of two objects, the kit comprising: two storage receptacles; an aerobic adhesive stored in one of the two storage receptacles; and a hydrophilic material containing moisture separately stored in the other of the two storage receptacles, wherein the two storage receptacles are adapted to permit removal of the aerobic adhesive and the hydrophilic material from the receptacles for mixing together the fixing agent.

This assembly kit has the advantage that enough moisture has already been added to the hydrophilic material stored in one of the receptacles. The operator therefore does not need to add liquid when mixing together the fixing agent. Rather, for the preparation of the fixing agent, it is sufficient to mix together the moisture-containing hydrophilic material and the separately stored aerobic adhesive.

The mixing together to form the fixing agents is consequently made even easier for an operator.

It is particularly advantageous if the assembly kit comprises a sachet or bag with two separate chambers which form the storage area, wherein the chambers of the sachet are separated by a clamp.

The sachet is preferably composed of a plastic material, but can alternatively also comprise an aluminum composite material, wherein in all cases it is a dense, gas-impermeable material. The clamp functions to separate and tightly close off the chambers of the sachet, so that they are separated completely. To mix together the fixing agent, it is only necessary to mechanically release the clamp, meaning to pull it away from the sachet. The separation between the chambers is thus removed and the hydrophilic moisture-containing material in the one chamber can be mixed together with the aerobic adhesive in the other chamber. It is advantageous in that case if the mixing by the operator is effected from the outside, meaning while the sachet is closed, in particular by gently squeezing it, wherein this mixing operation can be carried out easily and quickly.

Other embodiments of the assembly kit are also conceivable, for example in the form of injectors. According to a another embodiment of the invention, there is provided an assembly kit for fixation of two objects, the kit comprising: a receptacle including a removal element having a liquid or moisture store; a mixture of an aerobic adhesive and a dried hydrophilic material stored in the receptacle, the hydrophilic material being sufficiently dry to prevent reaction with the aerobic adhesive, wherein during a removal of the mixture from the receptacle via the removal element, the mixture comes in contact with the stored moisture or liquid which causes the hydrophilic material to react with the aerobic adhesive.

It is advantageous in this case that the mixture of aerobic adhesive and dried hydrophilic material inside the receptacle remains stable and can be stored over a long period of time at the suitable mixing ratio. Owing to the liquid or moisture store in the removal element, the mixture is then automatically brought into contact with the liquid or moisture, especially water, once the mixture leaves the receptacle, so that the mixture can react without additional operational steps, thereby forming the fixing agent.

It is particularly advantageous if the receptacle is a cartridge and the removal element is a nozzle which can be fitted onto the cartridge. The liquid or moisture store preferably consists of a porous material which can store the liquid or moisture. The liquid or moisture store can advantageously comprise plastic. The liquid or moisture store can thus take the form of an insert in the nozzle. In any case, the assembly kit forms a compact and cost-effective unit which is easy to use.

With both embodiments according to the invention, the layer thickness of the fixing agent can simply be predetermined by the structure of the hydrophilic material. Thus, if the hydrophilic material has a grainy structure, the fixing agent can be compressed only enough so that its layer thickness corresponds to the core diameter of its hydrophilic material.

BRIEF DESCRIPTION OF THE DRAWINGS

The invention is explained in the following with the aid of the drawings, which show in.

DETAILED DESCRIPTION OF THE INVENTION

Figure 1:
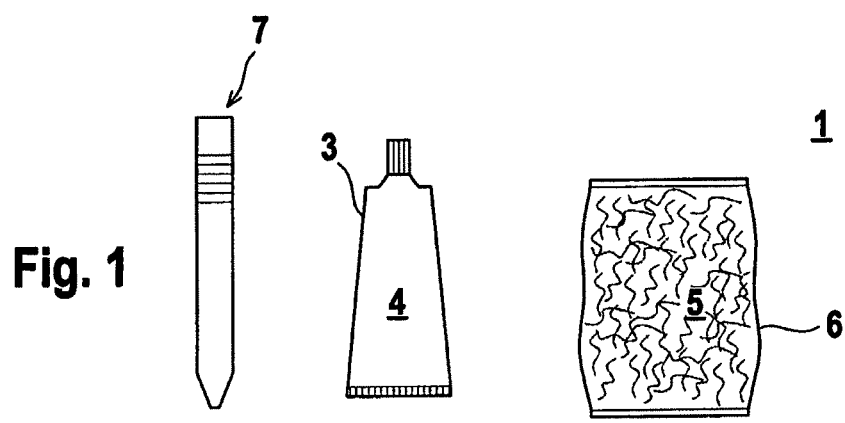
FIG. 1: A schematic representation of an assembly kit as disclosed in the DE 10 2009 023 285, with the components of the fixing agent according to the invention.
Figure 2:
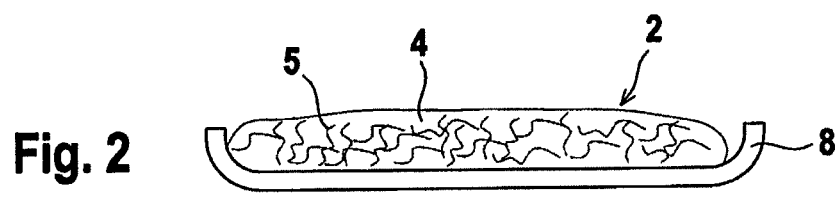
FIG. 2: The fixing agent mixed together inside a vessel.

FIG. 1 schematically shows an assembly kit 1, as described in the document DE 10 2009 023 285, with the individual components for producing a fixing agent 2 which is shown in the mixed together state in FIG. 2.

The assembly kit 1 comprises a tube 3 with therein stored aerobic adhesive 4. In the present case, the aerobic adhesive 4 may be composed of silane-modified (MS) polymers. The assembly kit 1 furthermore contains an amount of hydrophilic materials, which in this case are hydrophilic carrier fibers 5, stored inside a bag 6 or the like, wherein non-dried cotton is used here for the hydrophilic carrier fibers 5. A spatula 7 and, if applicable, an operating manual that is not shown herein complete this assembly kit 1.

Just prior to using it for attaching objects, the fixing agent 2 is produced by mixing together the components, namely the aerobic adhesive 4 and the hydrophilic carrier fiber 5. For this, the aerobic adhesive 4 and the hydrophilic carrier fibers 5 are poured into a vessel 8 or the like, as shown in FIG. 2, and are then mixed homogeneously with the spatula 7.

The spatula 7 is preferably a wooden spatula. This wooden spatula 7 is first submerged in water to obtain the moisture content which is suitable for a complete hardening of the mixture. The moisture contained in the spatula 7 is then transferred to the hydrophilic material, whereupon this hydrophilic material is mixed together with the aerobic adhesive 4 by stirring it with the spatula 7.

It is preferable if the volume share of hydrophilic carrier fibers 5 in the mixture is approximately 30 to 40%, wherein the weight share of the hydrophilic carrier fiber 5 in the mixture is on the order of 10%.

Immediately after preparing the fixing agent 2, this fixing agent is used for attaching two objects.

Figure 3:
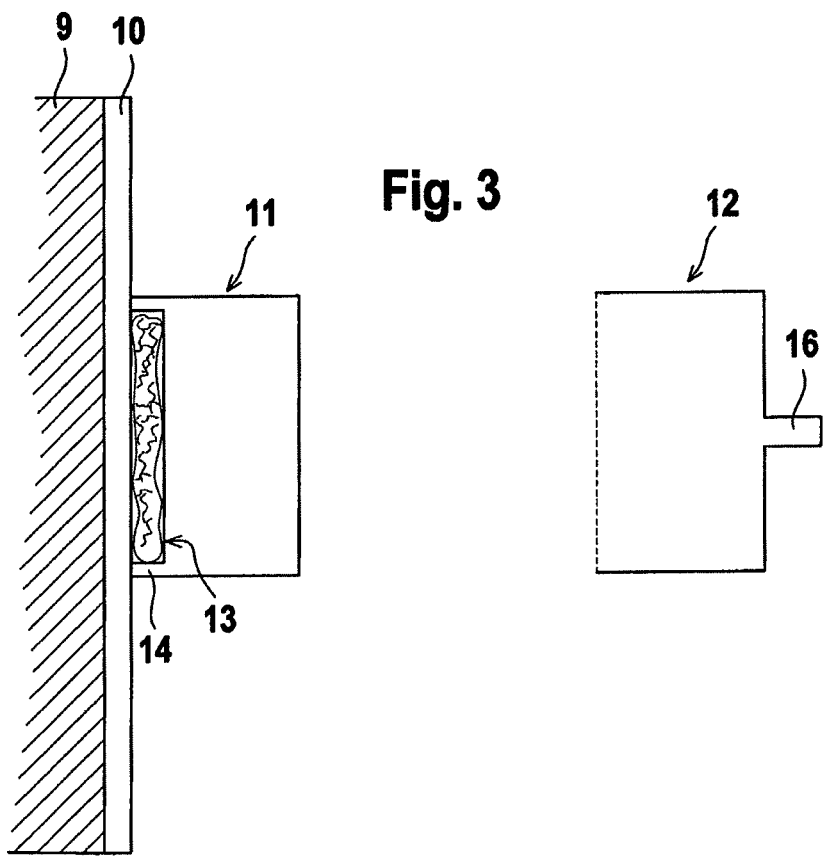
FIG. 3: The attaching of an object to a wall with the aid of the fixing agent according to FIG. 1.

FIG. 3 discloses one example of this, wherein FIG. 3 shows a detail of a wall 9 in a building, in particular in a room inside an apartment building, which is covered with a wall covering 10 in the form of tiles.

Attached to the wall covering 10 on the wall 9 is a fastening element 11 to which an equipment item is subsequently attached, in particular a sanitary equipment item such as a towel holder, a shelf, a shower armature or the like. Several such fastening elements 11 for attaching an equipment item can generally be provided.

FIG. 3 schematically shows a locking element 12 which forms a component of the equipment article and can be secured on the fastening element 11.

The fastening element 11 essentially has a circular disc-shaped contour. The underside, which faces the wall 9, contains a receptacle 13 which is delimited by an edge segment 14 along the complete circumference of the fastening element 11.

The freshly prepared fixing agent 2, shown in FIG. 2, is filled with the spatula 7 into the receptacle 13 of the fastening element 11, for example while the fastening element 11 is removed from the wall 9, thereby forming a defined moldable layer of the fixing agent 2.

The fastening element 11 with the layer of fixing agent 2 is then fitted onto the wall covering 10 of the wall 9. Owing to the fact that the aerobic adhesive 4 in the fixing agent 2 immediately exhibits a certain adhesive force, the fastening element 11, which has a diameter of only a few centimeters and very low inherent weight, is held securely in place on the wall covering 10.

To prevent the fixing agent 2 from exiting along the sides of the fastening element 11 during the operation of attaching the element to the wall covering 10, axially extending boreholes that end in the receptacle 13 can be provided in the fastening element 11 into which the excess fixing agent 2 can flow during the operation of attaching the element to the wall covering 10.

Even though the fixing agent 2 is located inside a completely enclosed space once the fastening element 11 is attached to the wall covering 10, meaning it has no contact with the ambient air, the aerobic adhesive 4 in the fixing agent 2 can harden completely from the inside out as a result of the admixture of the hydrophilic carrier fiber 5 since the required amount of moisture and/or the required amount of oxygen is stored in the hydrophilic carrier fiber 5.

Once the fixing agent 2 has hardened, the attachment of the fastening element 11 to the wall 9 provides a connection capable of withstanding loads, so that the equipment item can be mounted on it. The locking element 12 in the present case is attached to the fastening element 11 with the aid of a screw connection or a snap-in connection. The locking element 12, in turn, is provided with an element 16 on which the equipment article, such as a towel holder, can be secured.

Figure 4:
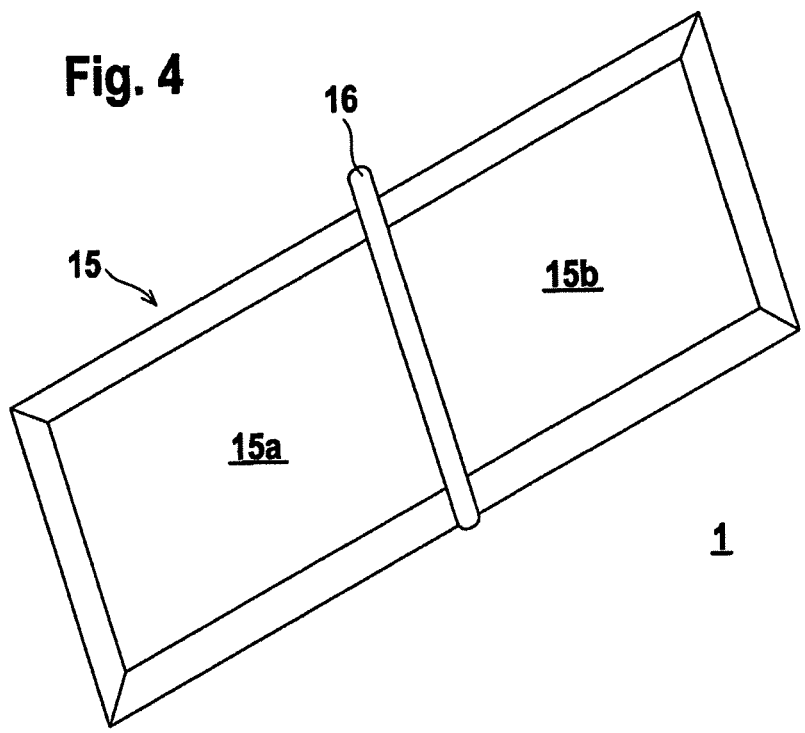
FIG. 4: A first embodiment of an assembly kit according to the invention.

FIG. 4 shows a one embodiment of the assembly kit 1 according to the invention. The assembly kit 1 comprises a sachet or bag 15 and a clamp 16. The sachet 15 may comprise a dense, especially gas-impermeable, material which may be, for example a plastic material, embodied as a flexible, bendable foil. The sachet 15 may forms a flat container with rectangular cross section. The clamp 16, which is fitted on from the outside, divides the inside space of the sachet 15 into two completely separate chambers 15a, 15b, meaning the clamp 16 forms a tight separating wall between the chambers 15a, 15b.

One chamber 15a contains the hydrophilic material with a specified admixture of moisture, for example water. The admixture of moisture is selected so as to ensure sufficient moisture for producing the fixing agent 2. Relative to its weight, the hydrophilic material may contain 8-12% moisture. The other chamber 15b contains the aerobic adhesive 4.

For producing the fixing agent 2 with the components stored in the chambers 15a, 15b, the clamp 16 is removed from the sachet 15, meaning the separating wall between the chambers 15a, 15b is removed. The aerobic adhesive 4 can then be mixed outside of the sachet 15 with the hydrophilic material. As a result, the fixing agent 2 is ready for use and, in particular, no additional admixture of moisture is required.

Figure 5:
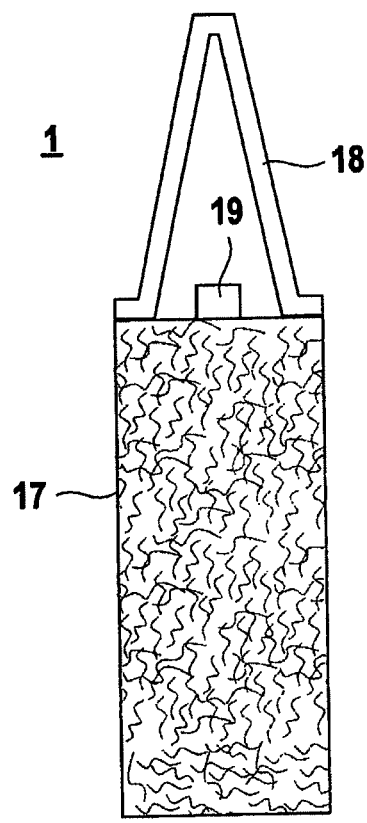
FIG. 5: A second embodiment of an assembly kit, as disclosed for the invention.

FIG. 5 shows a another embodiment of the assembly kit 1 according to the invention. The assembly kit 1 may comprise a cartridge 17 which forms the receptacle and a nozzle 18 that functions as a removal element. The cartridge 17 may be provided on the top with a stopper or seal 19 that closes off an opening.

The cartridge 17 contains a mixture of hydrophilic material and aerobic adhesive, wherein the hydrophilic material is dry enough, so that the hydrophilic material does not react with the aerobic adhesive. The hydrophilic material is preferably dried so that the residual moisture is only approximately 0%. The mixing ratio of hydrophilic material to aerobic adhesive is suitably selected such that the fixing agent can be produced without further admixture of hydrophilic material or aerobic adhesive.

For the present case, the nozzle 18 is composed of a porous material, at least in the region of its side walls, which functions as a liquid or moisture store. The liquid or moisture store contains sufficient amounts of water so that the mixture in the receptacle can react with the water.

During the storage, the seal 19 of the cartridge 17 remains closed. In order to produce the fixing agent with the mixture stored inside the cartridge 17 and then use it, the seal 19 is opened by fitting the nozzle 18 onto the cartridge 17. Once the mixture is removed from the cartridge 17 and reaches the inside of the nozzle 18, it comes in contact with the liquid or moisture store. As a result, the liquid, for example water, from the liquid or moisture store of the nozzle 18 comes in contact with the mixture, thereby allowing the hydrophilic material to react with the aerobic adhesive. Ready-to use fixing agent 2 then flows from the nozzle 18 and can be used immediately thereafter for connecting objects.

The invention claimed is:

1. An assembly kit for fixation of two objects with a fixing agent, the kit comprising:
   a receptacle including a removal element having a moisture store;
   a mixture of an aerobic adhesive and a dried hydrophilic material stored in the receptacle, the hydrophilic material being sufficiently dry to prevent reaction with the aerobic adhesive, wherein the removal element is constructed so that during a removal of the mixture from the receptacle via the removal element, the mixture automatically comes in contact with the stored moisture which causes the hydrophilic material to react with the aerobic adhesive to produce the fixing agent, and wherein the moisture store of the removal element contains sufficient moisture to permit complete hardening of the aerobic adhesive when the aerobic adhesive and the hydrophilic material are removed from the receptacle via the removal element.

2. The assembly kit according to claim 1, wherein the removal element comprises a nozzle and the receptacle comprises a cartridge.

3. The assembly kit according to claim 1, wherein the moisture store includes a porous material, and wherein the moisture store is a component of the nozzle or is an insert in the nozzle.

4. The assembly kit according to claim 3, wherein the aerobic adhesive comprises silane-modified (MS) polymers.

5. The assembly kit according to claim 1, wherein the hydrophilic material comprises a hydrophilic carrier fiber.

6. The assembly kit according to claim 1, wherein the fixing agent has a minimum layer thickness determined by a structure for the hydrophilic material.

7. The assembly kit according to claim 1, wherein at least one of a predetermined breaking point, basic adhesive force and the hardening speed of the fixing agent is predetermined by specifying the mixing ratio of aerobic adhesive to hydrophilic material.

8. A method for fixing an object on a base with the aid of a kit having two storage receptacles, wherein an aerobic adhesive and a dried hydrophilic material are stored in one of the two storage receptacles and a moisture store containing sufficient moisture to permit complete hardening of the aerobic adhesive when mixed with the aerobic adhesive and hydrophilic material is separately stored in the other of the two storage receptacles, wherein the two storage receptacles are adapted to permit removal of the aerobic adhesive, the dried hydrophilic material, and moisture from the respective receptacles, the method comprising:
   removing the aerobic adhesive, dried hydrophilic material, and the moisture from the respective receptacles;
   mixing together the aerobic adhesive and dried hydrophilic material with the moisture contained in the moisture store to form a fixing agent;
   subsequently applying a layer of the fixing agent to the object; and
   fixing the object on the base by pressing, with the object, the layer of fixing agent against the base, wherein the aerobic adhesive in the layer of fixing agent completely hardens solely as a result of the moisture-containing hydrophilic material.

9. The method according to claim 8, wherein the preparing includes supplying the dried hydrophilic material to the aerobic adhesive, maximally until the adhesive no longer absorbs hydrophilic material.

10. The method according to claim 8, wherein the object is a mechanical fastening device.

11. The method according to claim 8, wherein the base is a wall and the object is a fastening element on which an equipment item can be attached, wherein the wall comprises a wall covering of ceramic or similar tiles, or stone and marble plates to which the fastening element is attached.

12. The method according to claim 11, further including attaching the equipment item to the fastening element once the layer of fixing agent between the wall and the fastening element has hardened.

* * * * *